United States Patent
Luchner et al.

(10) Patent No.: US 6,700,285 B1
(45) Date of Patent: Mar. 2, 2004

(54) ELECTRICAL ROTATING MACHINE HAVING A ROTOR AND A STATOR EACH HAVING A NON-ROTATABLE CONNECTION BETWEEN CARRYING ELEMENT AND LAMINATIONS, AND METHOD OF MAKING SAME

(75) Inventors: Clemens Luchner, Baldham (DE); Bernhard Krasser, Munich (DE)

(73) Assignee: Bayerische Motoren Werke AG, Munich (DE)

( * ) Notice: Subject to any disclaimer, the term of this patent is extended or adjusted under 35 U.S.C. 154(b) by 0 days.

(21) Appl. No.: 09/642,103

(22) Filed: Aug. 21, 2000

(30) Foreign Application Priority Data

Aug. 20, 1999 (DE) .......................... 199 39 528

(51) Int. Cl.⁷ .................. H02K 15/02; H02K 15/00; H02K 1/18; H02K 1/30
(52) U.S. Cl. .................. 310/217; 310/216; 310/261; 29/596
(58) Field of Search .................. 310/51, 216–218, 310/254, 258, 261; 29/596, 598

(56) References Cited

U.S. PATENT DOCUMENTS

| | | | | |
|---|---|---|---|---|
| 1,688,891 A | * | 10/1928 | Spreen | 310/51 |
| 2,247,890 A | * | 7/1941 | Reardon | 310/216 |
| 3,477,125 A | * | 11/1969 | Schwartz | 29/596 |
| 3,541,823 A | | 11/1970 | Weadock, Jr. | 72/56 |
| 3,810,372 A | | 5/1974 | Queyroix | 72/56 |
| 4,471,252 A | * | 9/1984 | West | 310/154 |
| 5,306,123 A | * | 4/1994 | Day et al. | |
| 5,331,832 A | | 7/1994 | Cherian et al. | 72/56 |
| 5,457,977 A | | 10/1995 | Wilson | 72/56 |
| 5,586,460 A | | 12/1996 | Steingroever | 72/56 |

FOREIGN PATENT DOCUMENTS

| | | | |
|---|---|---|---|
| DE | 292175 | 1/1915 | |
| DE | 508 181 | 9/1930 | |
| DE | 1 037 572 | 8/1958 | |
| DE | 34 35 508 | 4/1986 | |
| DE | 295 00 984 | 5/1995 | |
| DE | 44 32 356 | 3/1996 | |
| EP | 1079498 | * 8/2000 | H02K/1/18 |

OTHER PUBLICATIONS

Stauffer, "Electromagnetic Metalforming", *Manufacturing Engineering*, pp. 74–76, Feb. 1978.

Loeten et al, "MagnetoPuls", Magnet–physik Dr. Steingroever Gmbh, 1997.

Physikalische Grundlagen, Schnelle Magnetische Umformung, Puls–Plasmatechnik GmbH (1998).

German Search Report dated Apr. 13, 2000 (with partial translation).

* cited by examiner

*Primary Examiner*—Karl Tamai
(74) *Attorney, Agent, or Firm*—Crowell & Moring LLP

(57) ABSTRACT

For an electrical rotating machine, it is suggested for the non-rotatable connection of a bundle of laminations with a rotor or a stator that the respective bundle of laminations have a profiled contact surface for an assigned rotor hub or an assigned stator housing, in which case, by an electromagnetic forming of the rotor hub or of the stator housing, which is effective at least in areas, its form-locking contact on the profiled contact surface of the respective bundle of laminations is achieved by plastic

12 Claims, 2 Drawing Sheets

ELECTRICAL ROTATING MACHINE HAVING A ROTOR AND A STATOR EACH HAVING A NON-ROTATABLE CONNECTION BETWEEN CARRYING ELEMENT AND LAMINATIONS, AND METHOD OF MAKING SAME

BACKGROUND AND SUMMARY OF THE INVENTION

This application claims the priority of German Patent Document 199 39 528.4, filed Aug. 20, 1999, the disclosure of which is expressly incorporated by reference herein.

The invention relates to an electrical rotating machine having a rotor and a stator, the rotor and the stator each comprising bundles of laminations positioned by way of separate carrying elements (rotor hub, stator housing), and a non-rotatable connection being achieved between the respective carrying element and the assigned bundle of laminations by a form-locking contact of the carrying element on the pertaining bundle of laminations which is caused by plastic deformation.

For fastening iron lamina on a rotor bush of an electrical rotating machine, it is known from the type-forming German Patent Document DE-PS 292 175 that, from the inside, the iron bush is so far expanded that it penetrates slightly between the individual lamination and holds them separate from one another. As a result, the wall of the rotor bush comes in intimate contact with the respective inner bore of the individual lamination so that a subsequent displacement is excluded. In this case, the material of the bush penetrates between the individual lamination and keeps them separate from one another.

A disadvantage of this known non-rotatable connection achieved by plastic deformation is the operationally unreliable absorption and transmission of high torques.

It is an object of the invention to indicate a simple further development in combination with an effective deformation process for the non-rotatable connection between the respective bundle of laminations and the pertaining carrying element of an electrical rotating machine for the reliable transmission of high torques.

This object is achieved in that the respective bundle of laminations has a profiled contact surface for the assigned carrying element, and in that, by an electromagnetic forming of the carrying element (hub) effective at least in areas, its form-locking contact is achieved on the profiled contact surface of the bundle of laminations.

By means of the invention, a highly stressable, non-rotatable connection is created in a particularly advantageous manner.

In the case of a rotor having a bundle of laminations with longitudinal grooves, a further development advantageous with respect to the fatigue strength is achieved in that the contact surface for the rotor hub has a wave profile, a surface-enlarging wave crest being assigned to each longitudinal groove.

By means of this further development, in addition to a mechanically highly stressable connection, an undisturbed course of the magnetic field lines around the longitudinal grooves is also achieved during use of the machine.

For an electrical rotating machine having a rotor of a low flywheel effect ($GD^2$), according to the invention, the rotor hub is constructed with a relatively thin-walled cylinder jacket which is molded into the wave profile of the bundle of laminations by means of electromagnetic formation.

For an electrical rotating machine having a rotor of a higher flywheel effect and/or a higher torque transmission, it is suggested that the rotor hub in the cast construction have a connection surface corresponding to the wave profile of the bundle of laminations, and that the shrinkage occurring with the cooling of the cast hub results in a joining play used for joining the cast hub with the bundle of laminations, which is eliminated after the joining by electromagnetic forming.

By means of this further development, a simplified manufacturing is achieved at reasonable cost, in which case the cast rotor hub, depending on the requirements, for reasons of acoustics and/or ventilation, may have a cylindrical or profiled design on the interior side.

Another aspect of the invention relates to the fact that an additional indentation is provided in the profiled contact surface of the respective bundle of laminations, a section of the rotor hub molded into the indentation by means of electromagnetic formation being used for the axial securing of the rotor hub relative to the bundle of laminations.

Thus, in addition to the torque transmission in the circumferential direction secured by the wave profile, an axial securing of the rotor is also achieved relative to its bundle of laminations.

The electrical rotating machine designed according to the invention is preferably used as an asynchronous motor, as a starter and generator device, which can be coupled to a crankshaft of an internal-combustion engine.

In the case of a stator which encloses the rotor in a conventional manner, the bundle of laminations of the stator, in the manner according to the invention, can be in a non-rotatable connection, for example, with a housing bell connecting the internal-combustion engine and the adjoining transmission, the housing bell being connected by means of electromagnetic forming with the bundle of laminations of the stator by plastic deformation.

Reference is made to the following publications for background information on electromagnetic forming:

(1) U.S. Pat. No. 3,541,823
(2) U.S. Pat. No. 3,810,372
(3) U.S. Pat. No. 5,331,832
(4) U.S. Pat. No. 5,457,977
(5) U.S. Pat. No. 5,586,460
(6) Article titled "Electromagnetic Metalforming", February 1978 issue of Manufacturing Engineers.

Other objects, advantages and novel features of the present invention will become apparent from the following detailed description of the invention when considered in conjunction with the accompanying drawings.

DETAILED DESCRIPTION OF THE DRAWINGS

Figures 1, 2:
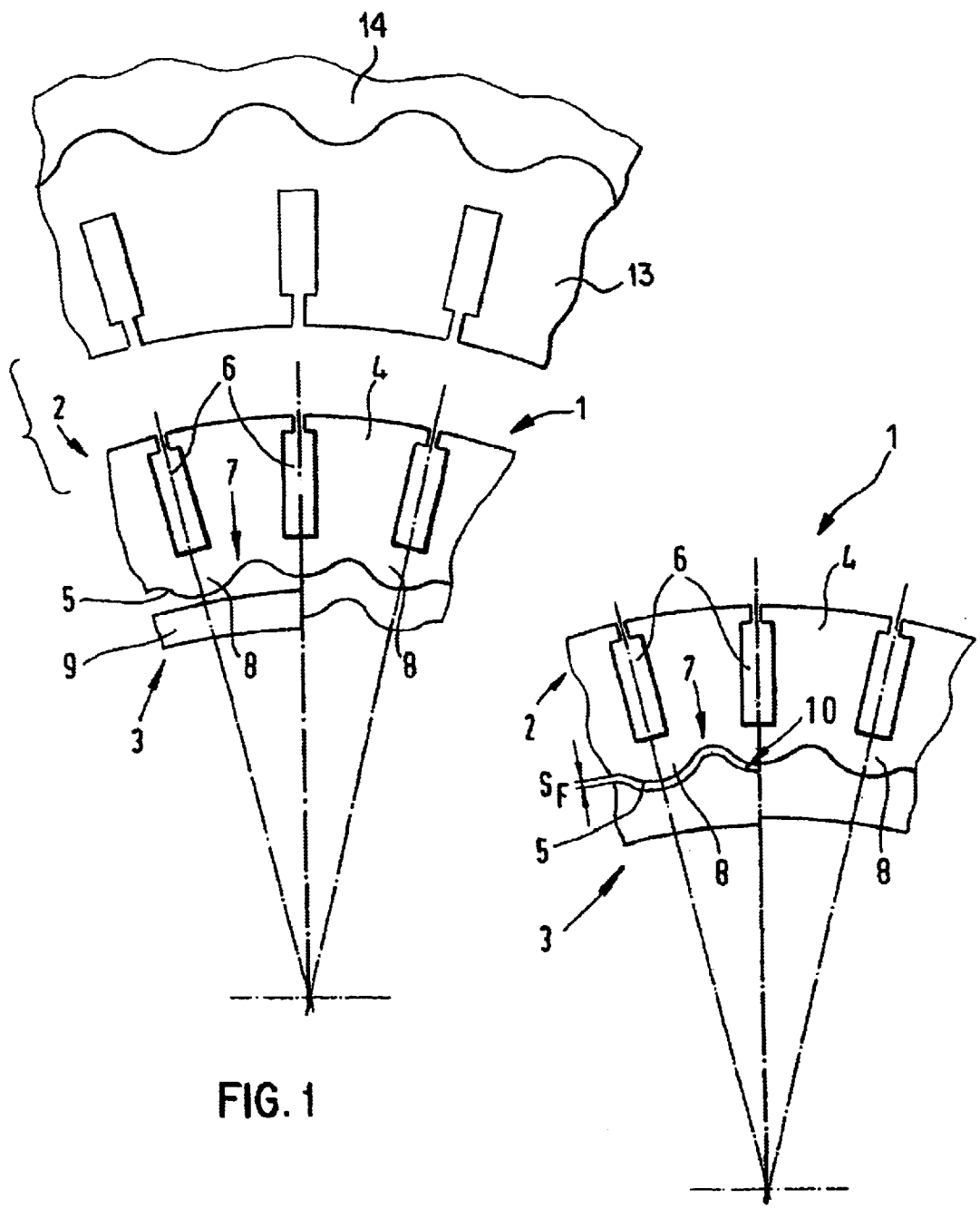
FIG. 1 is a view of a rotor hub with a thin-walled cylinder jacket, constructed according to preferred embodiments of the invention.
FIG. 2 is a view of a rotor hub in a cast construction in accordance with the invention.

An electrical rotating machine 1, which is illustrated only in sections in FIG. 1, comprises a conventional rotor 2 and a stator 13 which surrounds this rotor 2 the rotor 2 and stator 13 comprising a bundle of laminations 4 which can be positioned by way of a separate carrying element designed as a rotor hub 3 and a stator housing 14, respectively. A non-rotatable connection between the carrying element designed as a the rotor hub 3 or the stator housing 14, and the assigned bundle of laminations is achieved by a form-locking contact of the rotor hub 3 on the stator housing 14 on the pertaining bundle of laminations caused by plastic deformation.

For achieving a highly stressable non-rotatable connection between the bundle of laminations 4 and the rotor hub 3, a simple further development of the connection is to be indicated in combination with an effective deforming process.

According to the invention, the bundle of laminations 4 has a profiled contact surface 5 for the assigned wheel hub 3 for this purpose, by an electromagnetic formation of the rotor hub 3, which is effective at least in areas, the form-locking contact of the rotor hub 3 is achieved on the profile contact surface 5 of the bundle of laminations 4.

For each rotor 2 of FIGS. 1 and 2 which has a bundle of laminations 4 having longitudinal grooves 6, the respective contact surface 5 for the respective rotor hub 3 is designed as a wave profile 7, a surface-enlarging or cross-section-enlarging wave crest 3 being assigned to each longitudinal groove 6.

According to FIG. 1, the rotor hub 3 is constructed with a relatively thin-walled cylinder jacket 9 which is molded by electromagnetic forming into the wave profile 7 of the bundle of laminations 4 according to the right half of FIG. 1.

According to FIG. 2, a cast rotor hub 3 has a connection surface 10 which corresponds with the wave profile 7 of the bundle of laminations 4, the shrinkage occurring with the cooling of the cast hub 3 resulting in a joining play $S_F$ used for joining the cast hub 3 with the bundle of laminations 4, which is eliminated after the joining by electromagnetic formation.

Figure 3:
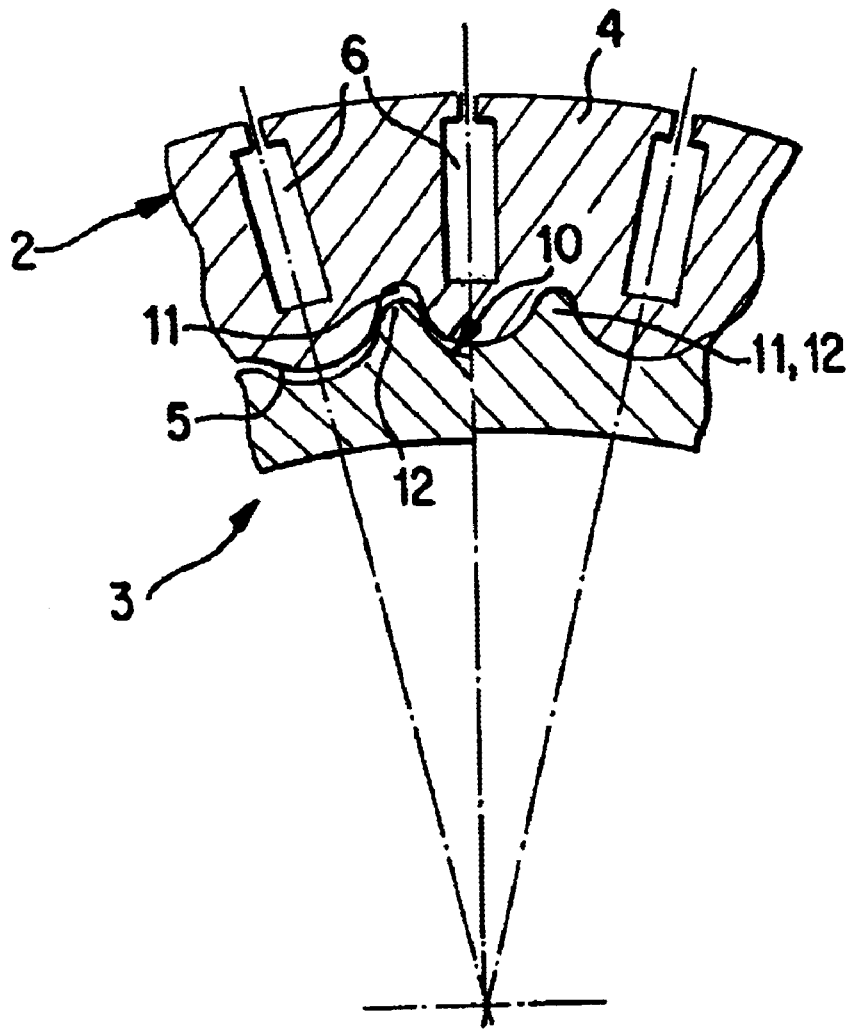
FIG. 3 is a cross-section view of the laminations with additional indentations, and a rotor hub having sections extending into the indentations.

For the axial securing of the rotor hub 3 relative to the bundle of laminations 4, an additional indentation 11, which is shown in FIG. 3, is provided in the profiled contact surface 5 of the bundle of laminations 4, a section 12 of the rotor hub 3, which is molded into the indentation during the electromagnetic forming, causing an axial securing.

The electrical rotating machine 1 designed according to the invention is preferably used as an asynchronous motor which can be coupled to a crankshaft of an internal-combustion engine, which is not shown, and is used as a starter and generator. Furthermore, a synchronous motor can also be used.

The construction according to the invention, which is described for a conventional rotor 2 according to FIGS. 1 and 2, applies also to a stator 13, in which case the stator 13 can enclose the rotor 2 or the rotor 2 encloses the stator 13.

The foregoing disclosure has been set forth merely to illustrate the invention and is not intended to be limiting. since modifications of the disclosed embodiments incorporating the spirit and substance of the invention may occur to persons skilled in the art, the invention should be construed to include everything within the scope of the appended claims and equivalents thereof.

What is claimed is:

1. Electrical rotating machine comprising a rotor and a stator, at least one of the rotor and the stator comprising bundles of laminations positioned by way of a carrying element (rotor hub 3 or stator housing), and a non-rotatable connection between the carrying element and the bundle of laminations by a form-locking contact of the carrying element on the bundle of laminations which is caused by plastic deformation, wherein the bundle of laminations has a profiled contact surface for the carrying element (rotor hub 3), wherein formn-locking contact is achieved on the profiled contact surface of the bundle of laminations by an electromagnetic forming of the carrying element (the rotor hub 3 or the stator housing) effective at least in certain areas, wherein the rotor has a bundle of laminations with longitudinal grooves.

wherein a contact surface for the rotor hub has a wave profile, and wherein a surface-enlarling wave crest is radially aligned with each longitudinal groove.

2. Electrical rotating machine according to claim 1, wherein the rotor hub is constructed with a relatively thin-walled cylinder jacket which is molded by electromagnetic forming into the wave profile of the bundle of laminations.

3. Electrical rotating machine according to claim 1, wherein the rotor hub in the cast construction has a connection surface which corresponds with the wave profile of the bundle of laminations, and wherein the shrinkage, occurring with the cooling of the cast hub results in a joining play ($S_F$) used for joining the cast hub with the bundle of laminations, which jointly play is eliminated after the joining by electromagnetic formation.

4. Electrical rotating machine according to claim 1, wherein an additional indentation is provided in the profiled contact surface of the respective bundle of laminations, and wherein a section of tho rotor hub, which is molded into the indentation during the electromagnetic forming, is used for the axial securing of the rotor hub relative to the bundle of laminations.

5. Electrical rotating machine according to claim 1, wherein an additional indentation is provided in the profiled contact surface of the respective bundle of laminations, and wherein a section of the rotor hub, which is molded into the indentation during the electromagnetic forming, is used for the axial securing of the rotor hub relative to the bundle of laminations.

6. Electrical rotating machine according to claim 2, wherein an additional indentation is provided in the profiled contact surface of the respective bundle of laminations, and wherein a section of the rotor hub, which is molded into the indentation during the electromagnetic forming, is used for the axial securing of the rotor hub relative to the bundle of laminations.

7. Electrical rotating machine according to claim 3, wherein an additional indentation is provided in the profiled contact surface of the respective bundle of laminations, and wherein a section of the rotor hub, which is molded into the indentation during the electromagnetic forming, is used for the axial securing of the rotor hub relative to the bundle of laminations.

8. Electrical rotating machine according to claim 1, comprising use of the rotating machine as an asynchronous motor or synchronous motor, as a starter and generator device, which can be coupled with a crankshaft of an internal combustion engine.

9. Electrical rotating machine according to claim 1, comprising use of the rotating machine as an asynchronous motor or synchronous motor, as a starter and generator device, which can be coupled with a crankshaft of an internal-combustion engine.

10. Electrical rotating machine according to claim 2, comprising use of the rotating machine as an asynchronous motor or synchronous motor, as a starter and generator device, which can be coupled with a crankshaft of an internal-combustion engine.

11. Electrical rotating machine according to claim 3, comprising use of the rotating machine as an asynchronous motor or synchronous motor, as a starter and generator device, which can be coupled with a crankshaft of an internal-combustion engine.

12. Electrical rotating machine according to claim 4, comprising use of the rotating machine as an asynchronous motor or synchronous motor, as a starter and generator device, which can be coupled with a crankshaft of an internal-combustion engine.

* * * * *